US 11,473,822 B2

(12) United States Patent
Bucceri

(10) Patent No.: US 11,473,822 B2
(45) Date of Patent: Oct. 18, 2022

(54) METHOD AND APPARATUS FOR MAKING FALLING SNOW

(71) Applicant: Alfio Bucceri, Brisbane (AU)

(72) Inventor: Alfio Bucceri, Brisbane (AU)

( * ) Notice: Subject to any disclaimer, the term of this patent is extended or adjusted under 35 U.S.C. 154(b) by 421 days.

(21) Appl. No.: 16/600,635

(22) Filed: Oct. 14, 2019

(65) Prior Publication Data

US 2020/0132353 A1 Apr. 30, 2020

(30) Foreign Application Priority Data

Oct. 27, 2018 (AU) .................................. 2018904077

(51) Int. Cl.
*F25C 3/04* (2006.01)
*F25C 1/145* (2018.01)

(52) U.S. Cl.
CPC ................ *F25C 3/04* (2013.01); *F25C 1/145* (2013.01); *F25C 2303/046* (2013.01)

(58) Field of Classification Search
CPC .................. F25C 3/04; F25C 2303/042; F25C 2303/044; F25C 2303/046; F25C 2303/048; F25C 1/14; F25C 1/145; F25C 1/147; F25C 5/12; A01G 15/00
See application file for complete search history.

(56) References Cited

U.S. PATENT DOCUMENTS

| | | | |
|---|---|---|---|
| 4,742,958 A | 5/1988 | Bucceri | |
| 4,793,142 A | 12/1988 | Bucceri | |
| 5,297,731 A | 3/1994 | Bucceri | |
| 6,334,327 B1 * | 1/2002 | Fujiwara | ............ B02C 13/2804 62/320 |
| 6,454,182 B1 | 9/2002 | Bucceri | |
| 6,554,200 B1 * | 4/2003 | Satonaka | .................. F25C 3/04 239/69 |
| 6,575,381 B1 * | 6/2003 | Fujiwara | .................. F25C 3/04 239/14.2 |
| 6,938,830 B2 | 9/2005 | Bucceri | |
| 6,951,308 B2 | 10/2005 | Bucceri | |
| 7,848,373 B2 | 12/2010 | Sudo | |
| 8,403,242 B2 | 3/2013 | Bucceri | |
| 9,909,796 B2 | 3/2018 | Bucceri | |
| 2002/0116122 A1 * | 8/2002 | Satonaka | .................. F25C 3/04 342/357.57 |
| 2014/0283539 A1 | 9/2014 | Wills | |
| 2018/0347882 A1 * | 12/2018 | Cech | ........................ F25C 3/04 |

FOREIGN PATENT DOCUMENTS

| | | | | |
|---|---|---|---|---|
| EP | 945694 A1 * | 9/1999 | ............. | F25C 1/145 |
| EP | 971185 A1 * | 1/2000 | ............. | F25C 1/145 |
| GB | 2324596 A * | 10/1998 | ............. | F25C 1/145 |

* cited by examiner

*Primary Examiner* — Darren W Gorman
(74) *Attorney, Agent, or Firm* — Hudak, Shunk & Farine Co. LPA

(57) ABSTRACT

A method and apparatus to create falling snow for use at ski resorts, theme parks and test and training facilities for use with drones, motor vehicles, autonomous vehicles and aircraft components.

21 Claims, 8 Drawing Sheets

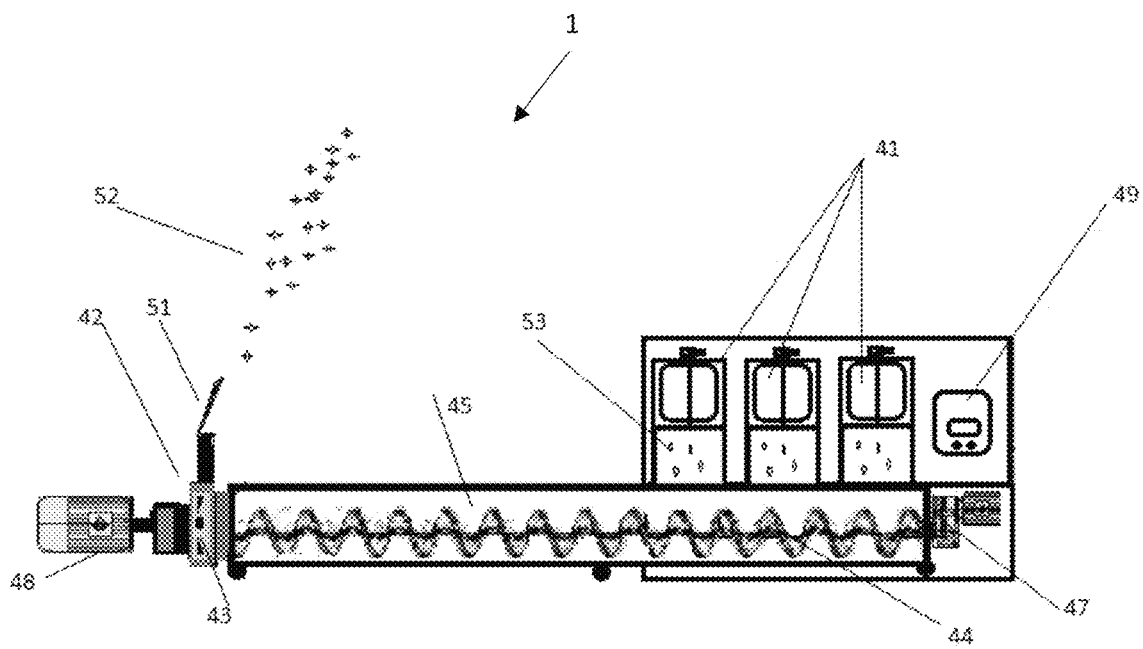
FIG. 4
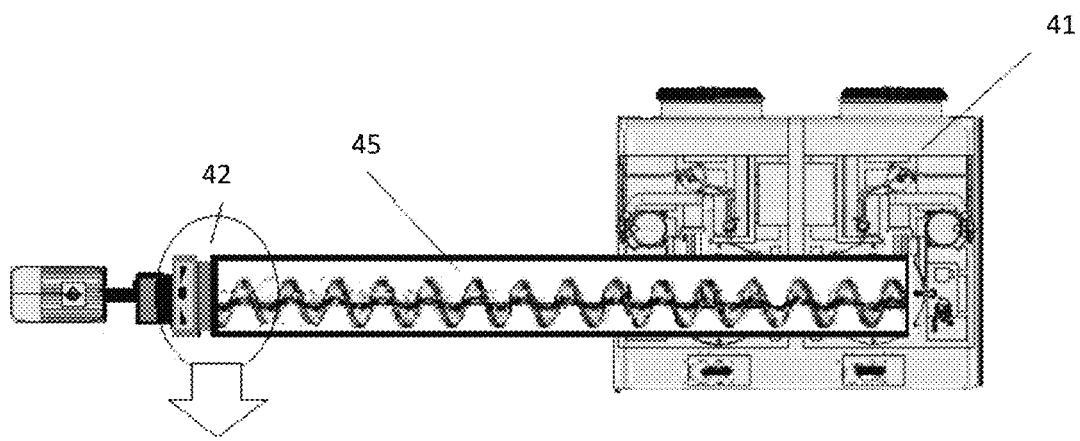
FIG. 5
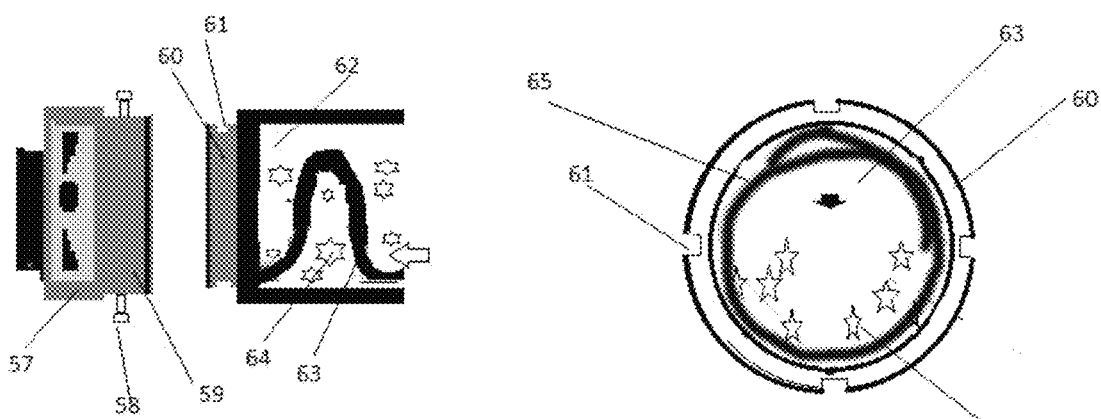
FIG. 6
FIG. 7

METHOD AND APPARATUS FOR MAKING FALLING SNOW

FIELD OF THE INVENTION

The invention relates to a method and an apparatus for creating falling snow for use at ski resorts, theme parks and test and training facilities for use with drones, motor vehicles, autonomous vehicles and aircraft components.

The present invention relates to a method and an apparatus for making falling snow with various densities of snow fall that can be produced at any temperature and can operate automatically to cover a large area.

Throughout the specification the term 'snow' shall include artificial snow, or manmade snow, consisting of frozen water and having characteristics to, if not identical to natural snow.

There have been many apparatuses for the manufacture of falling snow for use on ski slopes or entertainment precincts and some examples of the inventors own earlier proposals can be found in U.S. Pat. Nos. 7,484,373; 6,951,308; 6,938,830; 6,454,182; 5,297,731; 4,793,142; 4,742,958; and 8,403,242, reflecting the inventor's 30 years of research in this area of technology.

While the proposals have achieved commercial success, practical problems have limited the use of current state of the art systems to meet the requirements of covering large areas with falling snow in an economical and capable fashion.

U.S. Patent Application Publication No. 2014/0283539A1 and other similar patents teach the method for creating and maintaining a frozen road surface for winter recreational and sporting events and ice tracks for evaluating vehicle performance during cold weather conditions, but this and other similar uses of snow for this purpose cannot create the falling snow and variation in snow quality and density that is required to simulate the conditions of driving through or being present during a snowfall experience that would occur naturally.

The current state of art for producing falling snow are either foam chemical based falling snow machines that produce a foam like substitute for snow and small flake ice snow machines that are suspended overhead and drop small amounts of the ice flakes that are produced over a small area normally only 1 or 2 square feet for each machine. Neither of these machines would be suitable to meet the demands required for falling snow for a test facility where the snow must fall from heights as high as 100 feet and cover areas with a single machine covering 1000 square feet or more while maintain a real snowflake characteristic all the way to the landing position on the ground.

SUMMARY OF THE PRESENT INVENTION

It is the object of this invention is to create a falling snow apparatus and a falling snow system that can make large quantities of falling snow with a variation of snow flake sizes and output capacities that can cover large areas and can be used in locations where the temperature is plus or minus freezing that at least ameliorates the problems of the prior art methods.

It is a preferred object of the current invention to provide an apparatus that can be connected directly to a water supply and then turned on to produce falling snow that can be used at test facilities for pilots, motor vehicles, drones and aircraft equipment to improve the performance of the trainees and equipment in real life conditions, whether it be a light snow fall or a severe snow blizzard conditions.

It is common practice and essential for the future safety that as part of a new vehicle testing, pilot training or aircraft component development program that during the winter months, engineers and technicians seek out locations that are forecasted to provide the relevant weather conditions to carry out predetermined tests under these weather conditions to evaluate the performance of the vehicles and components or to train pilots how to operate in these conditions. Finding a suitable location based on the forecast for the ice and snow conditions can be guess-work at best and normally the completion of these tests depends almost completely upon the temperament of the environment and the completion of these tests can be delayed or aborted depending on the whim of Mother Nature. It is an object of this invention to create a falling snow apparatus that is simple to operate and guaranteed to provide the falling snow conditions necessary to complete the testing.

It is a further preferred object to provide an apparatus for making falling snow that can be used at all temperatures at ski resorts to enhance the winter experience for visitors and urban locations such as theme parks and events where large congregations of people can enjoy a real falling snow experience even when the temperature is above freezing.

Other preferred objects will become apparent from the following description.

In one aspect, the apparatus and system as described in this application is a multi-functional snow making system capable of producing high quality falling snow efficiently that can cover large areas and in large quantities and can be used in above and below freezing environments to provide various volumes and snow flake sizes of falling snow, including one or more of the following steps:

creating snow in a single apparatus that creates small flakes of ice by utilizing a rotating scraper blade that scrapes ice flakes off a refrigerated drum connected to a water supply to produce ice flakes that are a size of between 0.5 to 1 mm thickness and up to 12 mm long by 10 mm wide;

dropping, vacuuming and/or conveying these small flakes of ice into a fan impeller apparatus and making snow by impacting the small flakes of ice with fast turning blades so that the small flakes of ice are reduced to a miniature size similar to a natural snowflake;

blowing the stream of snowflakes skyward with the fan impeller via an outlet and in a cold air stream created by fresh air being cooled to below freezing temperatures as it travels through the ice flake generating machines;

adjusting the speed of rotation of the impeller to control the size of the snowflakes;

reversing the direction of the rotation of the impeller to control the size and shape of the snowflakes produced;

positioning a deflector that interacts and collides with the stream of snowflakes as they are thrown at high speed from the snow making machine impeller to control the size and shape of the snowflakes produced;

moving a deflector plate back and forth at quick intervals to control the coverage area of the stream of snowflakes;

adjusting the legs of the apparatus to maintain the machine in a level position on any form of terrain;

positioning the snow fall apparatus in a pattern to cover large areas with a full coverage of falling snow;

connecting multiple ice flake generating machines together for use with one or more snow impeller units.

Preferably, the rotating scraper blades of the ice flake generating machines are adjustable and can be rotated in a range of 1 to 40 RPM per minute, more preferably at about 20 RPM to create ice flakes with a thickness of 0.5 mm;

Preferably, the refrigerated drum of the ice flake generating machines is level and the surface of the drum where ice is formed is cooled by refrigeration to or below 0 degrees Fahrenheit (−17.78 degrees Celsius).

Preferably, the ice flakes produced in the ice flake generating machines will fall by gravity into the impeller and the incoming air stream produced by the spinning blades of the impeller will be cooled by travelling through each, refrigerated drum of the ice flake generating machines.

Preferably, the, or each, blade of the fan impeller impacts the ice flakes formed with a (preferably tangential) Velocity component in the range 150-600 Km/h (93-374 MPH); more preferably 180 260 Km/h (112-161 MPH); most preferably 200-220 Km/h (124-137 MPH).

Preferably, air passes through the refrigerated drum of the ice flake generating machines and is introduced into the fan impeller housing at cold temperatures to minimize any melt of the snowflakes as they are produced and to be discharged through at least one outlet with the stream of snowflakes.

Preferably, the, inlet and outlet for the snow making chamber is separated by at least 90 degrees; more preferably 270 degrees; in the standard direction of the rotation of the fan impeller so that the impacted snowflakes are subjected to no more than one rotation before being discharged from the outlet.

Preferably, the rotation of the fan impeller can be reversed to allow for the snowflakes to remain in the fan impeller housing for a longer period with at least 2 complete rotations to create smaller snowflakes before being discharged from the fan impeller outlet.

Preferably, the stream of snowflakes collides with a deflector plate at a high impact force as it is discharged from the fan impeller outlet to further reduce the size of the stream of snowflakes produced.

Preferably, the deflector plate is controlled by a retracting mechanism and is curved in shape to allow for the stream of snowflakes produced to be distributed over a larger area.

Preferably, the deflector plate can return to a neutral position when not required to allow for a straight plume of snowflakes to be discharged from the fan impeller outlet that do not impact with the deflector plate.

Preferably, the deflector plate can swivel around a circular outlet pipe to create a full 360 degrees of snow fall coverage.

The stream of snowflakes can be produced to cover large areas with a single machine up to 200 feet in diameter and 150 feet high; Preferably, the stream of snowflakes is blown into the air 80 feet above the position of the machine to cover an area of up to 25 feet (8 metres) wide by 66 feet (20 metres) long when the retracting deflector plate is used; which can be increased to cover an area 130 feet (40 metres) in diameter when used in conjunction with a rotating device that turns the deflector plate a full 360 degrees around the outlet pipe.

Preferably, the snow fall apparatus is controlled by a programmable logic controller that can be programmed to independently change the status of the deflector plate, fan impeller speed and the ice flake generating machines production rate to be able to cater for all snow fall requirements ranging from a light snow fall to a heavy snow fall that simulates blizzard conditions.

Preferably, the snow fall apparatus can be mounted on wheels for ease of movement.

In a second aspect, the present invention resides in a snow fall apparatus, including:

An insulated screw conveyor with an open outlet that is connected directly to the inlet of the fan impeller and is positioned below one or more of the ice flake generating machines that make the small flakes of ice;

a snow fall apparatus as previously described;

a means of controlling the screw conveyor.

Preferably, the screw conveyor is controlled by a programmable logic controller that can be programmed to move the ice flakes that produced away from the immediate ice flake drop zone area below the drums of the ice flake generating machines to a temporary storage position within the inner walls of the screw conveyor.

The screw conveyor can be 10 feet (3 metres) to 66 feet (50 metres) long, preferably 40 feet (12 metres) and can be mounted on wheels for ease of movement.

Preferably the screw conveyor can have multiple input ports to be connected to one or more ice flake generating machines.

Preferably, the outlet of the screw conveyor connects directly to the inlet of the fan impeller assembly.

Preferably, the screw conveyor is shaftless and has an unrestricted opening at the outlet point;

Preferably, the screw conveyor can be mounted on wheels for ease of movement.

Preferably, the screw conveyor can be levelled with adjustable legs for correct positioning below or at the side of the ice flake generating machines.

In a third aspect, the present invention resides in a snow fall apparatus, including:

a series of water nozzles positioned to spray and mix water in the direction of the stream of snowflakes produced;

a snow making apparatus as previously described;

Preferably, the water nozzles are standard snow making nozzles used on conventional snow making machines that can produce small droplets of high-pressure water that can adhere, freeze and multiply when ejected and mixed with the stream of snowflakes at sub-freezing temperatures:

Preferably, the water nozzle manifold is positioned on the deflector plate of the previously described snow fall apparatus;

Preferably, the water sprayed from the water nozzle manifold can be ejected and mixed with the stream of snowflakes at plus freezing temperatures to produce conditions simulating freezing rain, slush or hail.

In one aspect a method of using an apparatus for making falling snow is disclosed, including the steps of:

i. lowering a surface temperature of an internal surface of a refrigerated drum of an ice flake generating machine to 0 degrees Fahrenheit (−17.78 degrees Celsius) or below, the refrigerated drum connected to a water supply and a refrigeration means to produce ice flakes on the internal surface;

ii. separating the ice flakes produced on the internal surface by utilizing at least one rotating scraper blade that scrapes the ice flakes off of the internal surface;

iii. controlling the at least one rotating scraper blade by varying its rotation speed in order to create the ice flakes of various thicknesses;

iv. dropping the ice flakes into a fan impeller, the fan impeller comprising at least an impeller housing and at least one impeller outlet, impacting the ice flakes with turning blades of the fan impeller so that the ice flakes are reduced in size to form snow crystals;

v. utilizing a cold flow of air which has travelled through the refrigerated drum to reduce air temperature in the impeller housing before the fan impeller blows a stream of the snow crystals out through the at least one impeller outlet;

vi. adjusting a speed of rotation of the fan impeller to size and control the stream of snow crystals produced; and vii. reversing the rotation direction of the fan impeller in order to size, shape, and control the stream of snow crystals produced.

In a further aspect combinable with any of the above aspects, a deflector plate is positioned at the impeller outlet to deflect the stream of the snow crystals as they are thrown at high speed from the fan impeller, controlling size and shape of the stream of snow crystals produced.

In a further aspect combinable with any of the above aspects, the deflector plate moves in a reciprocating motion, deflecting the stream of snow crystals as they are thrown at high speed from the fan impeller, controlling a coverage area of the stream of snow crystals.

In a further aspect combinable with any of the above aspects the apparatus comprises adjustable legs to maintain a level position.

In one aspect a method for using an apparatus for making falling snow, including the steps of:

i. combining a plurality of ice flake generating machines together, each ice flake generating machine comprising at least one refrigerated drum, the at least one refrigerated drum connected to a water supply and a refrigeration means to produce ice flakes on an internal surface;

ii. lowering a surface temperature of the internal surface of the at least ne refrigerated drum to 0 degrees Fahrenheit (−17.78 degrees Celsius) or below and producing ice flakes on the internal surface;

iii. separating the ice flakes from the internal surface of each drum by utilizing at least one rotating scraper blade that scrapes ice flakes off of the internal surface of the refrigerated drum, iv. controlling the at least one rotating scraper blade, varying its rotation speed in order to create the ice flakes of various thicknesses;

v. dropping the ice flakes into a screw conveyor to store the ice flakes;

vi. moving the ice flakes by operation of the screw conveyor to a storage point within the screw conveyor;

vii. connecting an outlet of the screw conveyor to an inlet of a fan impeller in a straight-line configuration, the fan impeller comprising at least an impeller housing and at least one impeller outlet;

viii. operating the screw conveyor and the fan impeller, making snow crystals of various sizes by forcing the ice flakes from the screw conveyor and/or storage point into the fan impeller and impacting the ice flakes with turning blades of the fan impeller so that the ice flakes are reduced in size to form snow crystals.

In a further aspect combinable with any of the above aspects, a cold flow of air which has travelled through the at least one refrigerated drum is utilized to reduce air temperature in the impeller housing before the fan impeller blows a stream of snow crystals out through the at least one impeller outlet.

In a further aspect combinable with any of the above aspects, a speed of rotation of the fan impeller is adjusted to size and control the stream of snow crystals produced.

In a further aspect combinable with any of the above aspects, a rotation of the fan impeller is reversed in order to size, shape, and control the stream of snow crystals produced.

In a further aspect combinable with any of the above aspects, a speed of the screw conveyor is adjusted to control volume of the snow crystals produced by controlling the intake of the ice flakes into the fan impeller.

In a further aspect combinable with any of the above aspects, a deflector plate is positioned at the impeller outlet to deflect the stream of the snow crystals as they are thrown at high speed from the fan impeller, controlling size and shape of the stream of snow crystals produced.

In a further aspect combinable with any of the above aspects, the deflector plate moves in a reciprocating motion, deflecting the stream of snow crystals as they are thrown at high speed from the fan impeller, controlling coverage area of the stream of snow crystals produced.

In a further aspect combinable with any of the above aspects, a deflector plate can swivel around a circular outlet pipe to create a full 360 degrees of snow fall coverage.

In a further aspect combinable with any of the above aspects, the apparatus comprises adjustable legs to maintain a level position.

In a further aspect combinable with any of the above aspects, the apparatus is controlled by a programmable logic controller (PLC) that can be programmed to replicate different snow fall requirements including light snow fall to blizzard conditions.

In a further aspect combinable with any of the above aspects, the screw conveyor comprises multiple input connectors above and/or beside the screw conveyor to connect to additional ice flake generating machines.

In a further aspect combinable with any of the above aspects, a series of water nozzles are positioned to spray and mix water into the stream of snow crystals produced to form freezing rain, slush or hail.

In a further aspect combinable with any of the above aspects, the apparatus is controlled by a programmable logic controller (PLC) that can be programmed to replicate different snow fall and rain requirements including light drizzle, rain, hail, slush, snow falls and/or blizzard conditions.

BRIEF DESCRIPTION OF DRAWINGS

To enable the invention to be fully understood, and to enable a skilled addressee to put the invention into practice, several preferred embodiments will now be described, with reference to the accompanying illustrations, which are described in the following detailed descriptions:

FIG. 4 shows multiple ice flake generating machines positioned above a screw conveyor to supply a single fan impeller;

FIG. 5 is an overhead view of FIG. 4 being multiple ice flake generating machines positioned above a screw conveyor to supply a single fan impeller and showing the screw conveyor and fan impeller connection;

FIG. 6 shows the connection of the screw conveyor to the fan impeller;

FIG. 7 shows the outlet of the screw conveyor and details how the ice flakes are directed to impact on an impeller blade as the screw conveyor turns and feeds the inlet of the fan impeller;

FIG. 1 shows the snow fall apparatus 1 and the components that make up the snow fall apparatus. The water required for making snowflakes is connected to the inlet pipe 2 and supplied to a water tank 3 that is controlled by a float valve 4. A refrigeration condensing unit 5 maintains the walls of a circular drum of a drum evaporator freezer 6 at a temperature of around 0 degrees Fahrenheit (−17.78 degrees Celsius).

Figure 1:
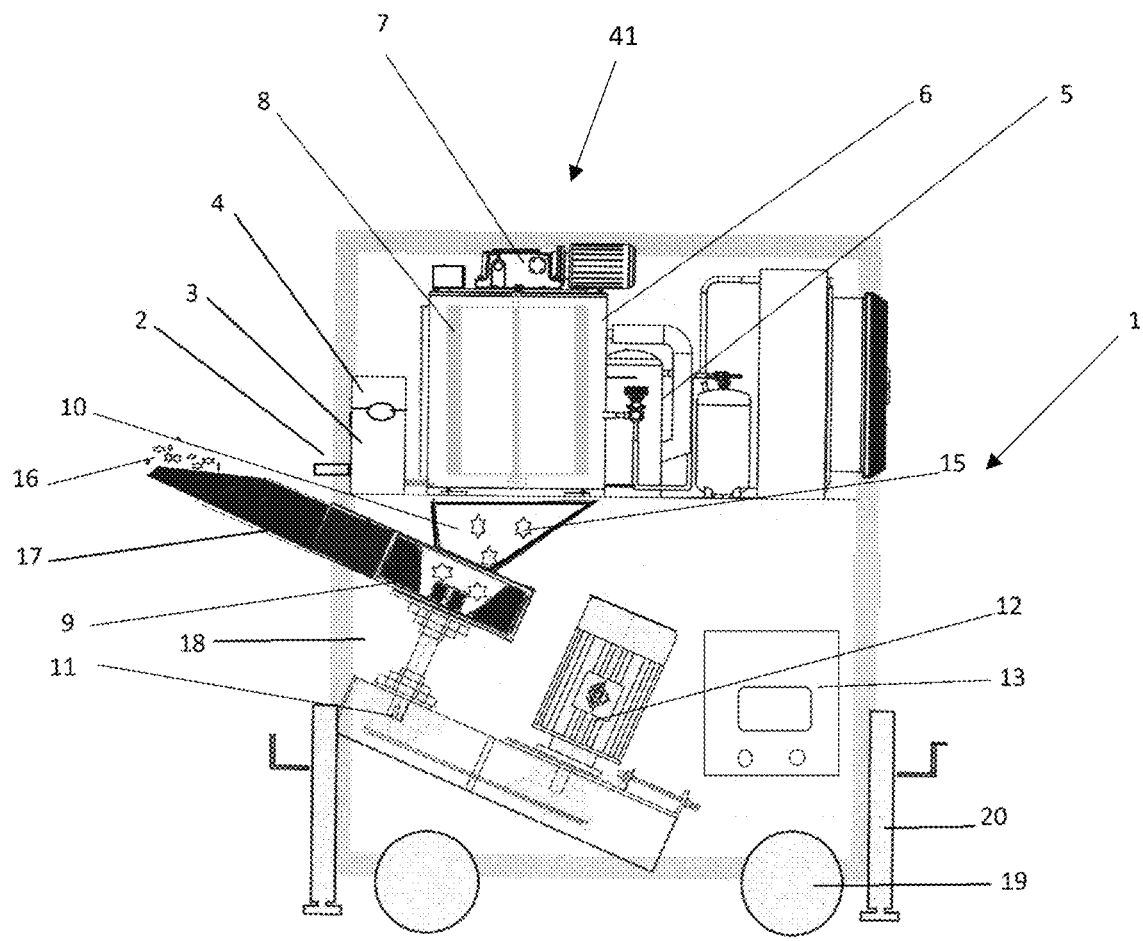
FIG. 1 shows a mobile single snow fall apparatus showing the ice flake generating machines, fan impeller and water supply.

Water from the tank 3 is pumped to the top of the ice flake generating machine into an open channel and the water spills over and flows evenly down the inner walls of the drum evaporator freezer 6 and the water is frozen as it flows down the walls and converted to ice. A variable speed geared motor 7 rotates the scraper blade assembly 8 and the ice that is formed is scraped off the wall and converted into small ice flakes 15 that fall by gravity in a downward direction into a collection hopper 10 that feeds a fan impeller 9.

The fan impeller 9 assembly is connected to a motor 12 that can have a pulley and belts 11 that rotate the fan impeller unit at various speeds. All electrical equipment is connected to a control panel 13 fitted with variable speed drives to control the rotation of the spinning motor 7. The fan impeller 9 creates an airflow and impacts with the ice flakes 15 as the fan impeller motor 12 spins to produce the stream of snowflakes that produce the snow fall 16.

The adjustable deflector plate 17 is controlled by the control panel 13 and is connected to the fan impeller assembly 9. All components of snow fall apparatus 1 preferably are housed in a stainless-steel enclosure and frame 18 and the unit is fitted with wheels 19 and levelling guides 20 on each corner.

Figure 2:
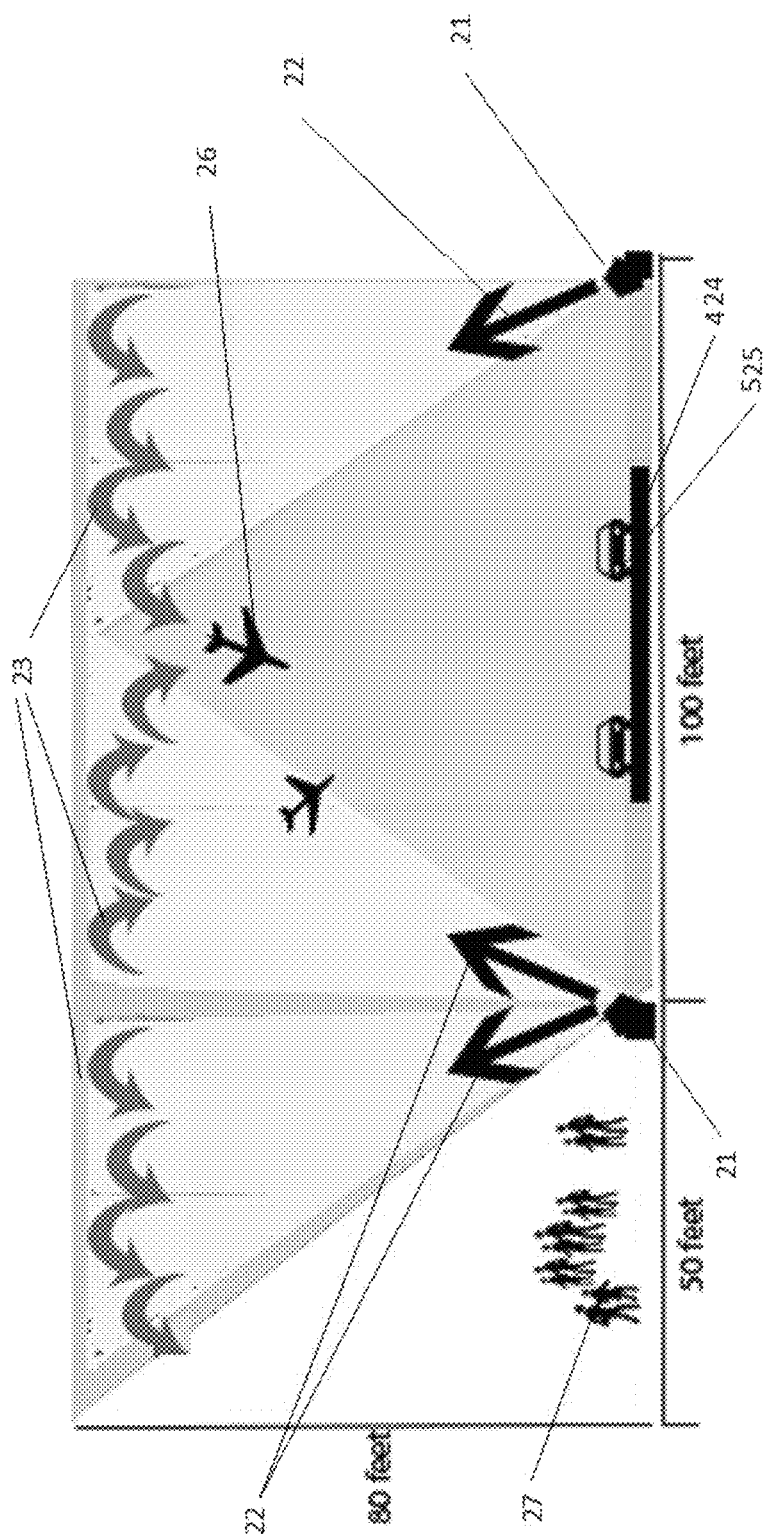
FIG. 2 is an illustration of the use of the snow fall apparatus in practice.

FIG. 2 illustrates the use of the snow fall apparatus 21 when being used to blow the stream of snowflakes into the sky 22 and falling to the ground 23 while covering a large area for the purpose of testing motor vehicles 525 in falling snow conditions on a vehicle test tracks 424 and also shows the snow fall apparatus 21 being used to test sensors and components of airborne vehicles such as drones 26 and also shows how the snow fall apparatus 21 being used to create a large stream of snowflakes to cover an area above a large gatherings of people 27.

Figure 3:
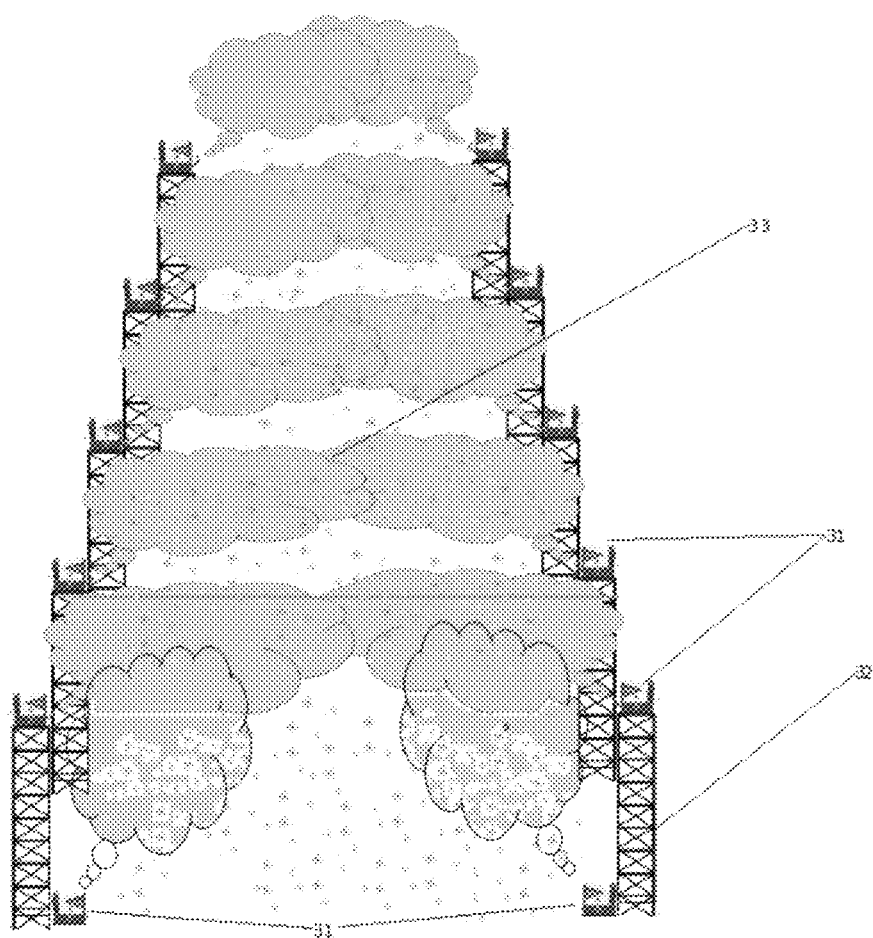
FIG. 3 is an illustration showing multiple snow fall apparatus single units positioned together and utilized in a testing field to cover a large area with a snow fall.

FIG. 3 illustrates a flight path, roadway or walkway 33 created with multiple snow fall apparatus 31 positioned on the ground or on platforms 32 to create a fully functional snow fall area where the total area will experience the snow falling from above.

FIG. 4 illustrates multiple ice flake generating machines 41 combined to form a single snow fall apparatus with a screw conveyor 45 and fan impeller interconnected with the ice flake generating machines to create a standalone snow fall apparatus 1 that produces a large stream of snowflakes over a large area. Referring now to the drawing and how the system would operate, the ice flake generating machines 41 create small flakes of ice on a refrigerated drum and control the cutter blades of the scraper blade assembly that scrape the ice off the surface of the drum. The ice flake generating machines 41 are fitted with speed controllable scraper blade assembly motors to produce small flakes of ice 53 that fall by gravity into a suitably sized screw conveyor 45 with an inlet opening positioned to capture the small flakes of ice 53 as they fall by gravity. A programmable logic controller is positioned in the control panel 49 and controls the screw conveyor motor 47 and will automatically start the screw conveyor when the area 44 below the ice flake generating machines 41 has filled and will then move the buildup of the small flakes of ice 53 to a position in the direction of the fan impeller 42 to free up the inlet opening space in the screw conveyor 45 below the flake ice generators 41.

In this way, the screw conveyor 45 works as a storage area for small flakes of ice 53 when batch production of the small flakes of ice 53 is required to store the small flakes of ice 53 before feeding them to the fan impeller blades 43 to make a stream of snowflakes that are blown into the air at set times and for a set duration. The programmable logic controller controls the storage and transfer of the small flakes of ice 53 within the screw conveyor until the storage is full. When the stream of snowflakes 52 are ready to be blown skywards, the programmable logic controller controls the direction of rotation and the speed of the fan impeller motor 48, the operation of the deflector plate motor 51 and controls the speed of rotation of the screw conveyor motor 47 to control the height and area coverage of the stream of snowflakes for a set time until the snowflakes are exhausted, after which time the process is repeated. The screw conveyor 45 is connected directly to the inlet of the fan impeller 42 and the ice flakes are pushed directly into the blades of the fan impeller blades 43.

Using this method of operation there is no limit to the amount of falling snow to be produced as one fan impeller and screw conveyor combination can handle an unlimited number of ice flake generating machines. Using various combinations of ice flake generating machines it is possible to produce a stream of snowflakes from 220 pounds (100 kilograms) to 52,800 pounds (24,000 kilograms) per hour using a single screw conveyor and impeller fan apparatus.

FIG. 5 shows the view of FIG. 4 from above the ice flake generating machines 41 and shows the direct connection of the screw conveyor 45 and the fan impeller 42.

FIG. 6 shows a quick connect circular-shaped tube connector 59 at the inlet of the fan impeller 57 and fasteners, such as the threaded bolts 58 that are used for securing to the tube connector 60 positioned on the screw conveyor 62. The screw conveyor 62 has a circular shaped tube connector 60 at the outlet that fits inside the fan impeller connector 59. The two connectors are pushed together and secured by screwing the fastening bolts 58 into the threaded screw holes 61 which allows the small flakes of ice 64 to be conveyed by the screw blades 63 directly into the inlet of the fan impeller 57.

FIG. 7 shows the outlet of the screw conveyor 2 and clear path 65 that allows the direct flow of the small flakes of ice to the screw conveyor outlet. The threaded screw holes 61 are positioned in the tube connector 60 to secure the screw conveyor 62 to the fan impeller 57.

Figure 8:
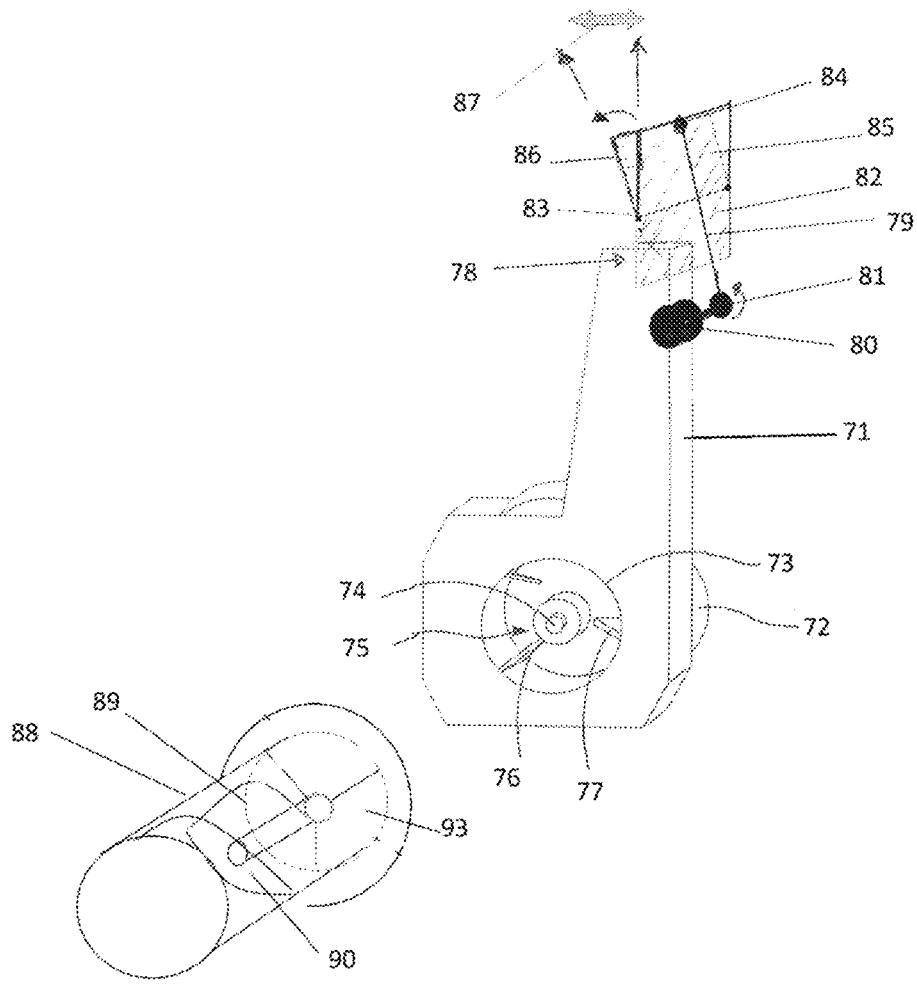
FIG. 8 shows the standard fan impeller mechanism and the retractable deflector mechanism.

FIG. 8 shows the fan impeller apparatus 73 that is manufactured from stainless steel or other high impact metal whereby small flakes of ice are introduced though the inlet opening 75. The fan impeller shaft 74 is rotatably journaled in the apparatus 73 and is driven at a high rotational speed with the speed controlled by a programmable logic controller to create the desired snow throw distance. The fan impeller shaft 74 is operated by suitable mechanical drive means 72 (e.g. an electric motor & transmission). The fan impeller shaft 74 spins the high-impact impeller blades 76, 77 of the rotating tubular fan impeller apparatus 73 to miniaturize the small flakes of ice and blow the stream of snowflakes produced at high velocity through the outlet pipe 71.

A retractable deflector plate 78 is positioned at end of the outlet pipe 71 and consists of a permanent base plate 82 that is connected by a hinge 83 to an upper deflector plate 85. The deflector plate 85 is rotated or retracted backwards and forwards on the hinge 83 and is controlled by the motor 80 connected to the eccentric circular part 81. Rod 79 connects at position 84 permanently to the retracting deflector plate 85 and connects, preferably, to the outside hole of the eccentric circular plate 81 to create a forward and backward retraction equal to the diameter of the circular plate providing one full forward and backward retraction for each revolution of the motor with the forward position referenced as 86 and arrows 87 indicating direction of movement. A programmable logic controller controls the speed of the motor 80 and is normally set to 0.5 to 2 revolutions per second. The screw conveyor 88 connects via the outlet connection 93 directly to the fan impeller inlet opening 75 to form one straight path. The screw conveyor shaft 90 turns the screw blades 89 and the small flakes of ice can be pushed directly into the opening of the fan impeller 75.

Figure 9:
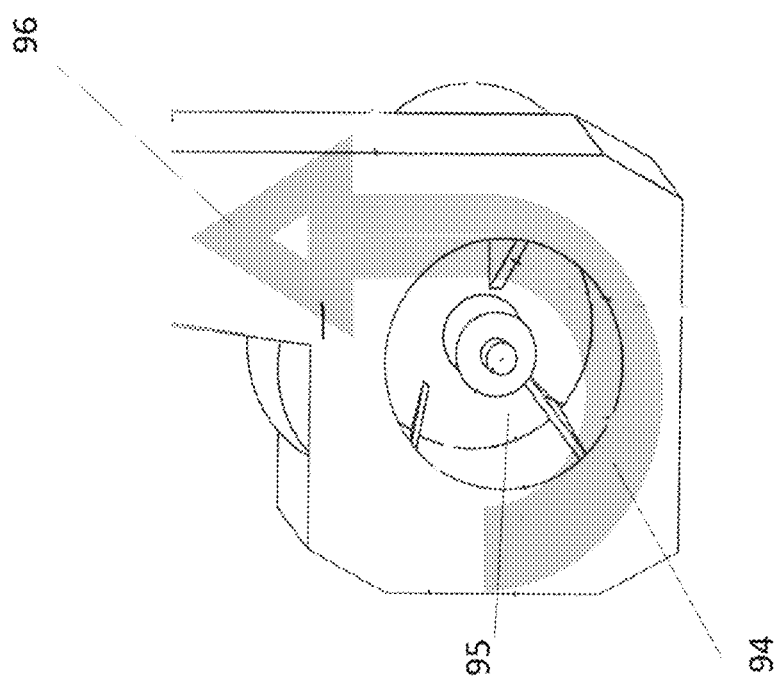
FIG. 9 shows the impact of reversing the rotation of the fan impeller and the effect this has on the ice flakes and the stream of snowflakes produced from the ice flakes while in the impeller fan housing for the additional time.

FIG. 9 shows the limited time the small flakes of ice are within the fan impeller housing 95 when rotated counter-clockwise 94 which creates one collision of the blades before the stream of snowflakes are discharged through the fan impeller outlet 96.

Figure 10:
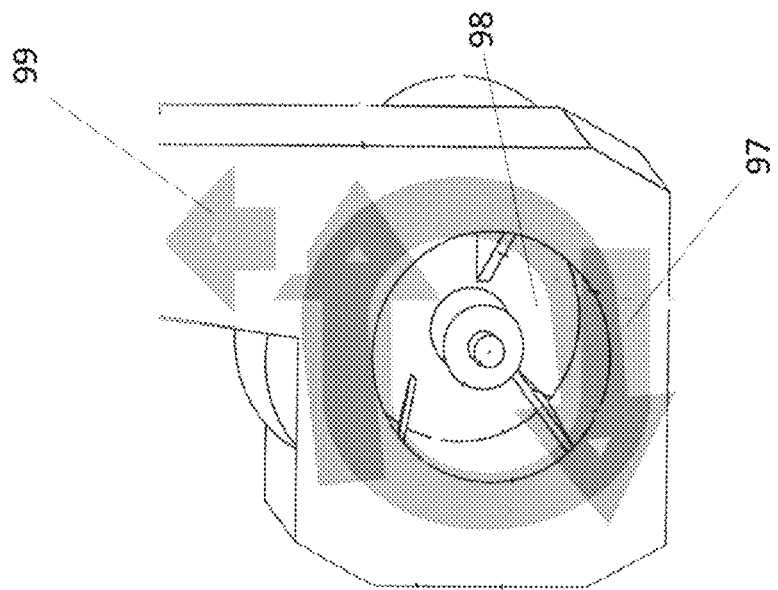
FIG. 10 shows the impact of the reversing mechanism on the ice flakes while in the impeller fan housing.

FIG. 10 shows the extended time and additional rotations of the small flakes of ice within the fan impeller housing 98 when rotated clockwise 97 and the additional contact with the fan impeller blades created by this reversing of the rotation until the stream of snowflakes produced are thrown by centrifugal force and fan air pressure through the fan impeller outlet 99. This reverse operation is important in cold or subzero conditions where a super fine stream of snowflakes is required. The rotational direction of the fan impeller motor is controlled by a programmable logic controller and this operation for producing super fine stream of snowflakes is programmed into the software for the system.

Figure 11:
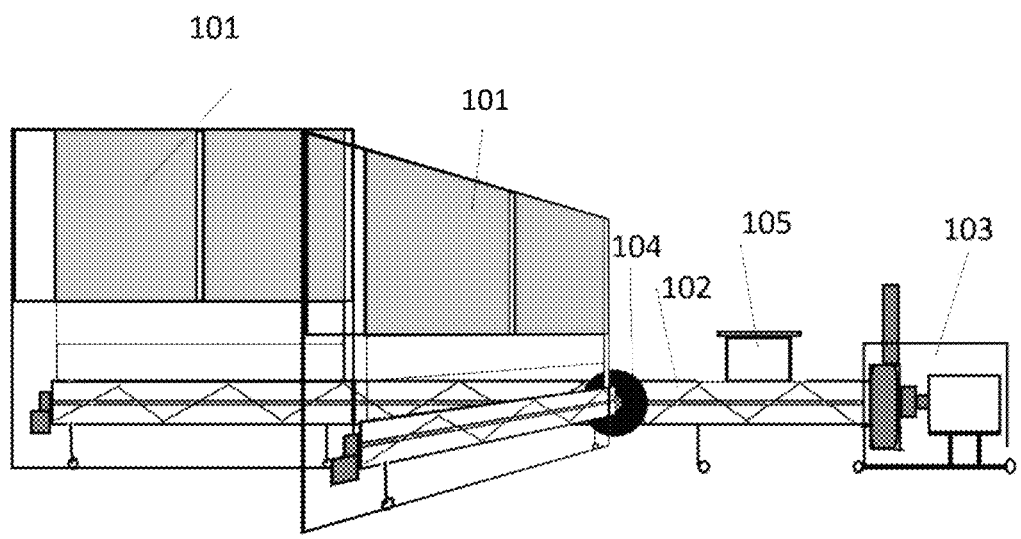
FIG. 11 shows multiple ice flake generating machines positioned above a screw conveyor to supply a single fan impeller feeding ice to one fan impeller system.

FIG. 11 illustrates additional outlets on a single screw conveyor fan impeller combination apparatus 103 to allow the connection of additional modules of ice flake generating machines 101. The ice flake generating machines are connected to the main screw conveyor at flange connection 104 which provides an inlet at the side of the main screw conveyor/fan impeller apparatus to push the small flakes of ice at an angle into the path and direction of the main screw conveyor which then pushes the small flakes of ice from all ice generating machines 101 into the fan impeller 103. Additional inlet openings can be added at the top of the main screw conveyor/impeller fan assembly 103 as a means of manually adding ice flakes into the screw conveyor 102 through secure opening 105. The opening 105 provides a usable feature in the event of a system breakdown or for adding other testing mediums such as fog or dust which could be added at this point.

Figure 12:
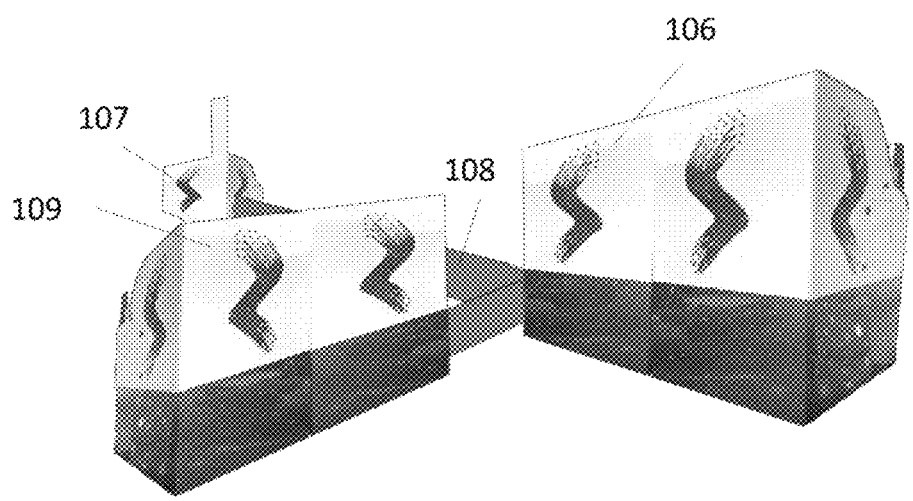
FIG. 12 is an illustration showing multiple ice flake generating machines positioned above a screw conveyor that supplies ice flakes to a single fan impeller that are converted to create a stream of snowflakes.

FIG. 12 illustrates two packaged modules of ice flake generating machines 106 and 109 connected to the screw conveyor 108 that feeds the snowfall impeller 107.

Figure 13:
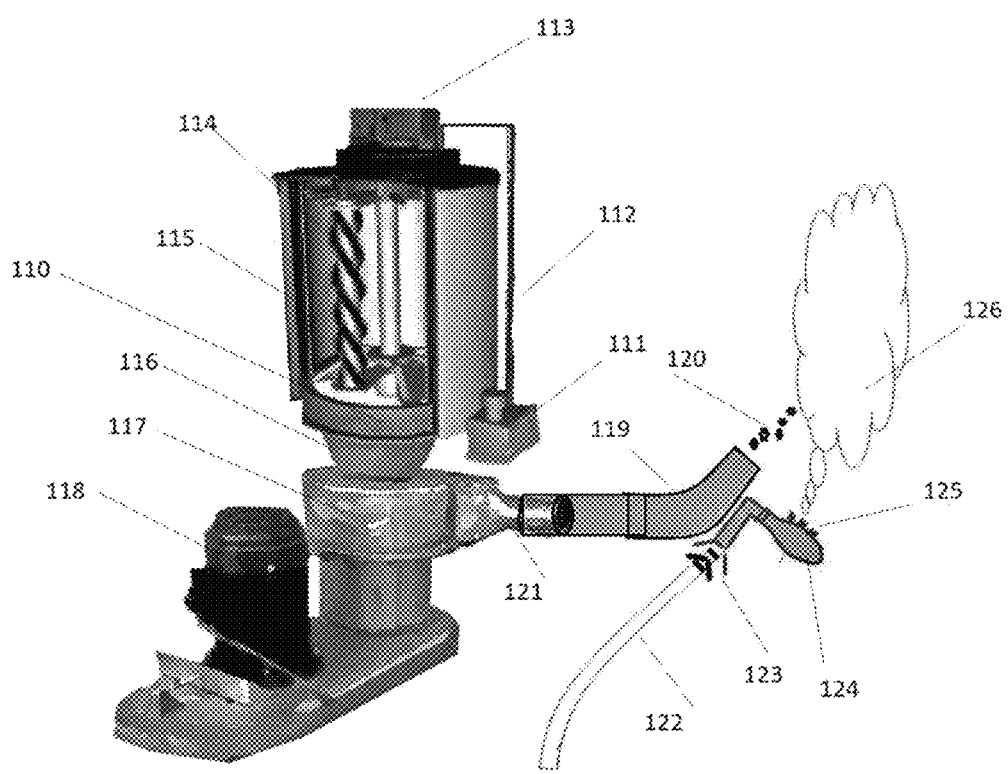
FIG. 13 shows the snow fall apparatus with a water manifold connected so as to create freezing rain, slush, hail and for sub-freezing snow making.

FIG. 13 illustrates snow fall apparatus 110 and the components that make up the snow fall apparatus 110. Water from the water tank 111 is fed to the refrigerated drum freezer walls 114 through piping 112. As the water spills over and, preferably flows evenly, down the inner walls 114 of the drum freezer, the water is frozen and converted to ice. The geared motor 113 rotates the scraper blade assembly 115 and the ice that is formed is scraped off the wall into small flakes of ice that fall by gravity in a downward direction into the collection hopper 116. The impeller fan assembly 117 is connected to a motor 118 that drives the fan impeller unit 117 at various speeds, all electrical equipment is connected to a control panel with a programmable logic controller to control the rotation direction and speed of the motor 118. As the fan impeller 117 spins, it produces a stream of snowflakes that are expelled from the fan impeller outlet 121 into the path of the adjustable deflector plate 119 that fall from the sky as falling snow 120.

As the stream of snowflakes are blown from the snow fall apparatus 117, they collide with the snow deflector plate 119 that has a raised center line and the snow-like particles are further miniaturized and thrown upwardly at a very high speed. For conventional snow making at sub-freezing temperatures and to be able to create additional quantities of falling snow 126 or to create rain, frozen rain, hail or slush for test facilities, a water spray apparatus is connected to the snow fall outlet piping. The water nozzles 125 are positioned on a heated manifold 124 and spray in the same direction as the exiting stream of snowflakes and are connected to a water hose or pipe 122 by connection fitting 123. The snow deflector plate 119, the nozzles 125 and the water manifolds 124 are preferably heated to prevent freezing during operation.

Before describing specific embodiments of the present invention, the following explanatory comments should be noted.

The snow fall apparatus (i.e. method and apparatus) of the present invention, uses water only for snow making and can be used at any temperature.

The techniques used to create a continuous snow fall over a large area at a great height and control the size of the snow crystals and hence the ability to maintain them in a frozen state has been gained through many years of working with our patented fan impeller system and practicing the techniques to meet the ever-growing demand for snow making solutions.

The growth in airborne delivery vehicles such as drones and the testing required for the pilots and the vehicles themselves has made the demand for large scale falling snow machines greater than ever before.

With the advent of online shopping and the use of drones for delivery of goods purchased online, the need for a system for testing these drones and training the pilots in all weather conditions will be a necessity in the future.

Specialized equipment such as cameras and sensors to be placed on these drones and other form of aircraft will need to be tested before use in the field and pilots who drive the drones will need also have the skill to be able to maneuver them in all weather conditions in particular those conditions frequently found in cold winter locations such as blizzards, snow flurries and frozen rain. While there are testing facilities available for drone and aircraft sensor testing, to the best of our knowledge there are no such test facilities available that provide the ability to test in all forms of falling snow situations.

In another field there have been patents lodged for creating frozen roads for testing all forms of motor vehicles and drivers in intrepid weather conditions, to the best of our knowledge there has been no system developed to create the blizzards, frozen rain, hail or snow falls or snow flurries essential for vehicle engineers to test new vehicles to be certified for safety.

A purpose-built falling snow machine has never been available commercially to allow for full saturation of a large area with controlled and varied snow falls. The snowfall created can be a heavy blizzard, snow flurries, any snow fall programmed to drop at a certain depth of snow per hour period, wet snow, freezing rain, slush and even hail. It would seem obvious that if such commercial equipment existed then all motor vehicles and all drivers of commercial vehicles such as buses and trucks should be tested and trained in these extreme conditions that they would encounter in their line of work.

Not only the testing of the cars but the training of the drones and their pilots is also essential for the safety of goods being delivered in adverse weather conditions.

Theme parks and large amusement centers entertain their customers in a variety of ways and in some locations have large fountains of water where people can watch and see and be entertained by viewing these large plumes of water as they reach up to the sky. A falling snow experience that can be turned on with a flick of a switch can in the same way entertain large crowds of people where they cannot only view but can also experience the naturally occurring phenonium of snow fall which is normally only available to experience in Alpine conditions.

To the best of our knowledge there are no large-scale falling snow machines that make natural falling snow from water to cover large areas. There are products that make falling snow by mixing water with a surfactant to create a foam snow. The foam snow does not have the same characteristics of real snow and the use of it for testing or training drivers would not be suitable as the product does not react in a similar manner to frozen water snow. Another disadvantage is the environmental impact of having the foam flow into drains, rivers and streams.

Small falling snow machines have been created that drop ice flakes over a very small area these machines are normally located in the ceiling or roof of a room and the flakes drop about 8 feet (2 metres) down and cover a very small footprint. While these machines serve a novelty purpose, their use would not be suitable and impossible to meet the requirements to perform drone and other vehicle testing, which require a snow fall area of at least of 80-foot-high by 300-foot-long and 100 foot wide. These dimensions have been established by aircraft engineers in the industry. The 2.4 million cubic feet volume of continuous falling snow coverage can only be met by machines designed and developed to meet such a target range. The invention with a cluster of machines totaling 24 with 12 positioned either side of the test area can meet this requirement.

The invention is the first commercial system that has been designed to meet to meet these needs. The successful pursuit of this target has been based on 40 years' experience in the field, previous experience in use of the patented impeller system used commercially now in various forms of snow making and in particular research and advancements in the propelling the snow to increased heights while retaining the snowflakes in a frozen form until they drop to the ground.

When machines are grouped together, for example at a distance 25 feet apart and 100 feet across from each other, an indefinite length of falling snow coverage can be created to cover the width of a football field and also an indefinite length to create the snow fall test facility of the future.

To understand the invention and the positive results achieved then one must understand the relationship between the size of the snowflake expelled from the apparatus and the existing ambient temperature conditions to ensure the snow does not melt before landing on the ground. The distance a snowflake must travel can be as high as 100 feet which means that it must travel a total of 160 feet from the output of our falling snow apparatus until it reaches the ground in a frozen state. During this journey the snowflake will encounter elements that will melt the snowflake such as high humidity, air temperatures above freezing, wind and sunshine. All these elements act in this short period of flight to melt the stream of snowflakes. So, while a very small snowflake can be blown in sub-freezing temperatures and not melt, the same snowflake would quickly turn to water if created and blown in above freezing conditions. The apparatus and software are programmed to generate the required size of the snowflake for use at warmer conditions and this is achieved by controlling the speed and direction of rotation of 4 or more motors that operate the flake ice generating machines, the screw conveyor, the fan impeller and deflector plate. By controlling these parts of the snow fall apparatus it is possible to create a thicker and larger stream of snowflakes which will survive hotter conditions and allow the stream of snowflakes to remain frozen until they fall to the ground.

We have tested the falling snow apparatus at temperatures up to 90 degrees Fahrenheit blowing the snow 100 feet into the air and achieved the positive results of having streams of snowflakes remain frozen until they hit the ground. This was achieved by producing a larger snowflake in the stream that will be melted in part only and still have enough body left so that 60 to 80% of the snowflake falls in a frozen stream. To achieve this for all temperatures, we have created a database to understand the melt rates that we should experience when the snow is blown at certain densities, heights and weather conditions. From this data we can generate the correct size snow crystal needed to meet the demand.

The snow making apparatus is operated by a programmable logic controller which controls the operation so that one can create various average thickness and dimensions of the snowflakes produced to ensure that the majority of snowflakes will fall to the ground in a frozen state.

The snow system of the present invention is based on the creation of snow using the patented impeller system disclosed in U.S. Pat. No. 8,403,242 (Bucceri); where snow is created from ice by using a high speed rotor, with special cutting blades, that smashes the ice into a fluffy snow product, that is long lasting and is easily laid on a ski field by the inbuilt blower that is also used with the cutting blades to make the snow and U.S. Pat. No. 9,909,796 (Bucceri) where the fan impeller create and vacuums snow-like particles that are created and blown into the air; a high pressure mist of water is added to the stream of snow that is thrown skyward; and the snow acts as a nucleating source, that will freeze the water droplets that have been introduced; to create large quantities of falling snow, that can be used for ski fields or other recreational applications.

The vertical throw snow throw from the invention at a rotation of 4000 RPM can achieve 100 feet (30 metres) and one small unit could cover an area of 1500 square feet (150 square metres) using the full 360 swivel turning position. (The height and area of coverage would be greater at higher fan impeller speeds). This is a big advantage when permanent snow making units are required for snow coverage for a ski resort or ski center applications where individual machines can be positioned every 60 feet (20 metres) up the side of a ski slope.

The skilled addressee will appreciate that ancillary equipment has not be illustrated in all drawings, such ancillary equipment may include refrigeration equipment; water-storage and/or pumping equipment; electricity generating, or the like. Such equipment does not form part of the present invention.

For the avoidance of doubt, the apparatus and devices of the present invention encompass all possible combinations of the components, including various ranges of said components, disclosed herein. It is further noted that the term 'comprising' does not exclude the presence of other elements. However, it is also to be understood that a description of an apparatus comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed:

1. A method of using an apparatus for making falling snow, including the steps of:
   i. lowering a surface temperature of an internal surface of a refrigerated drum of an ice flake generating machine to 0 degrees Fahrenheit (−17.78 degrees Celsius) or below, the refrigerated drum connected to a water supply and a refrigeration means to produce ice flakes on the internal surface;
   ii. separating the ice flakes produced on the internal surface by utilizing at least one rotating scraper blade that scrapes the ice flakes off of the internal surface;
   iii. controlling the at least one rotating scraper blade by varying its rotation speed in order to create the ice flakes of various thicknesses;
   iv. dropping the ice flakes into a fan impeller, the fan impeller comprising at least an impeller housing and at least one impeller outlet, impacting the ice flakes with turning blades of the fan impeller so that the ice flakes are reduced in size to form snow crystals;
   v. utilizing a cold flow of air which has travelled through the refrigerated drum to reduce air temperature in the impeller housing before the fan impeller blows a stream of the snow crystals out through the at least one impeller outlet;
   vi. adjusting a speed of rotation of the fan impeller to size and control the stream of snow crystals produced; and
   vii. reversing the rotation direction of the fan impeller in order to size, shape, and control the stream of snow crystals produced.

2. The method of claim 1, wherein:
a deflector plate is positioned at the at least one impeller outlet to deflect the stream of the snow crystals as they are thrown at high speed from the fan impeller, controlling size and shape of the stream of snow crystals produced.

3. The method of claim 2, wherein:
the deflector plate moves in a reciprocating motion, deflecting the stream of snow crystals as they are thrown at high speed from the fan impeller, controlling a coverage area of the stream of snow crystals.

4. The method of claim 1, wherein:
the apparatus comprises adjustable legs to maintain a level position.

5. A method for using an apparatus for making falling snow, including the steps of:
   i. combining a plurality of ice flake generating machines together, each ice flake generating machine comprising at least one refrigerated drum, the at least one refrigerated drum connected to a water supply and a refrigeration means to produce ice flakes on an internal surface;
   ii. lowering a surface temperature of the internal surface of the at least one refrigerated drum to 0 degrees Fahrenheit (−17.78 degrees Celsius) or below and producing ice flakes on the internal surface;
   iii. separating the ice flakes from the internal surface of each drum by utilizing at least one rotating scraper blade that scrapes ice flakes off of the internal surface of the refrigerated drum;
   iv. controlling the at least one rotating scraper blade, varying its rotation speed in order to create the ice flakes of various thicknesses;
   v. dropping the ice flakes into a screw conveyor to store the ice flakes;
   vi. moving the ice flakes by operation of the screw conveyor to a storage point within the screw conveyor;
   vii. connecting an outlet of the screw conveyor to an inlet of a fan impeller in straight-line configuration, the fan impeller comprising at least an impeller housing and at least one impeller outlet;
   viii. operating the screw conveyor and the fan impeller, making snow crystals of various sizes by forcing the ice flakes from the screw conveyor and/or storage point into the fan impeller and impacting the ice flakes with turning blades of the fan impeller so that the ice flakes are reduced in size to form snow crystals.

6. The method of claim 5, wherein:
a cold flow of air which has travelled through the at least one refrigerated drum is utilized to reduce air temperature in the impeller housing before the fan impeller blows a stream of snow crystals out through the at least one impeller outlet.

7. The method of claim 5, wherein:
a speed of rotation of the fan impeller is adjusted to size and control the stream of snow crystals produced.

8. The method of claim 5, wherein:
a rotation of the fan impeller is reversed in order to size, shape, and control the stream of snow crystals produced.

9. The method of claim 5, wherein:
a speed of the screw conveyor is adjusted to control volume of the snow crystals produced by controlling the intake of the ice flakes into the fan impeller.

10. The method of claim 5, wherein:
a deflector plate is positioned at the at least one impeller outlet to deflect the stream of the snow crystals as they are thrown at high speed from the fan impeller, controlling size and shape of the stream of snow crystals produced.

11. The method of claim 10, wherein:
the deflector plate moves in a reciprocating motion, deflecting the stream of snow crystals as they are thrown at high speed from the fan impeller, controlling coverage area of the stream of snow crystals produced.

12. The method of claim 10, wherein:
the deflector plate can swivel around a circular outlet pipe to create a full 360 degrees of snow fall coverage.

13. The method of claim 5, wherein:
the apparatus comprises adjustable legs to maintain a level position.

14. The method of claim 5, wherein:

the apparatus is controlled by a programmable logic controller (PLC) that can be programmed to replicate different snow fall requirements including light snow fall to blizzard conditions.

15. The method of claim 5, wherein:

the screw conveyor comprises multiple input connectors above and/or beside the screw conveyor to connect to additional ice flake generating machines.

16. The method of claim 5, wherein:

a series of water nozzles are positioned to spray and mix water into the stream of snow crystals produced to form freezing rain, slush or hail.

17. The method of claim 16, wherein:

the apparatus is controlled by a programmable logic controller (PLC) that can be programmed to replicate different snow fall and rain requirements including light drizzle, rain, hail, slush, snow falls and/or blizzard conditions.

18. The method of claim 5, wherein:

an inlet opening is present at a top of the screw conveyor.

19. The method of claim 18, wherein:

the inlet opening is present at a location between the ice flake generating machines and the inlet of the fan impeller.

20. The method of claim 5, further including:

the step of manually adding one or more of ice flake, fog and dust to an inlet opening present at a top of the screw conveyor.

21. The method of claim 20, wherein:

the inlet opening is present at a location between the ice flake generating machines and the inlet of the fan impeller.

* * * * *